(12) United States Patent
Peng

(10) Patent No.: US 7,151,738 B2
(45) Date of Patent: Dec. 19, 2006

(54) APPARATUS AND METHOD FOR COUPLING LIGHT TO A THIN FILM OPTICAL WAVEGUIDE

(75) Inventor: Chubing Peng, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 623 days.

(21) Appl. No.: 10/718,162

(22) Filed: Nov. 20, 2003

(65) Prior Publication Data

US 2005/0111309 A1    May 26, 2005

(51) Int. Cl.
*G11B 7/135* (2006.01)
*G02B 6/12* (2006.01)

(52) U.S. Cl. .............. 369/112.27; 369/44.23; 369/13.11; 385/14; 385/50

(58) Field of Classification Search .......... 369/112.27, 369/112.01, 44.23, 13.11; 385/50, 14, 125, 385/37, 129, 39, 130, 131, 132
See application file for complete search history.

(56) References Cited

U.S. PATENT DOCUMENTS

| 4,691,982 | A |   | 9/1987  | Nishimura et al. |
| 5,436,991 | A |   | 7/1995  | Sunagawa et al. |
| 5,463,705 | A | * | 10/1995 | Clauberg et al. ............... 385/14 |
| 5,838,854 | A | * | 11/1998 | Taneya et al. ................. 385/50 |
| 5,940,568 | A | * | 8/1999  | Losch ......................... 385/129 |
| 6,031,951 | A |   | 2/2000  | Stiens |
| 6,236,773 | B1|   | 5/2001  | Butler et al. |
| 6,487,328 | B1|   | 11/2002 | Butler et al. |
| 6,993,236 | B1| * | 1/2006  | Gunn et al. .................. 385/131 |
| 2001/0012423 | A1 |  | 8/2001 | Butler et al. |
| 2003/0031413 | A1 |  | 2/2003 | Kimerling et al. |

OTHER PUBLICATIONS

J. H. Harris et al., "Theory and Design of Periodic Couplers," *Applied Optics*, vol. 11, No. 10, Oct. 1972, pp. 2234-2241.
T. Tamir et al., "Analysis and Design of Grating Couplers," *Applied Physics*, vol. 14, Jun. 28, 1977, pp. 235-254.

* cited by examiner

*Primary Examiner*—Ali Neyzari
(74) *Attorney, Agent, or Firm*—Robert P. Lenart, Esq.; Pietragallo, Bosick & Gordon LLP

(57) ABSTRACT

An optical waveguide comprises a core guiding layer; a cladding layer positioned adjacent to the core guiding layer; a reflective layer positioned adjacent to the cladding layer; and a grating for coupling light into the core guiding layer; wherein the cladding layer has a thickness such that a ray reflected from the reflective layer is phase matched to an incident ray at the grating. A method of coupling electromagnetic radiation into the optical waveguide is also described.

18 Claims, 7 Drawing Sheets

US 7,151,738 B2

APPARATUS AND METHOD FOR COUPLING LIGHT TO A THIN FILM OPTICAL WAVEGUIDE

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to optical waveguides, and more particularly to optical waveguides that can be used in optical recording and thermally assisted magnetic recording.

BACKGROUND OF THE INVENTION

In thermally assisted optical/magnetic data storage, information bits are recorded on a layer of a storage medium at elevated temperatures, and the heated area in the storage medium determines the data bit dimension. In one approach, an electromagnetic wave in the form of light is used to heat the storage medium. For recording, it is preferred to have a high light throughput to the storage layer of the medium.

Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. Heat assisted magnetic recording allows for the use of small grain media, which is desirable for recording at increased areal densities, with a larger magnetic anisotropy at room temperature to assure sufficient thermal stability. Heat assisted magnetic recording can be applied to any type of magnetic storage media, including tilted media, longitudinal media, perpendicular media and patterned media.

Heat assisted magnetic recording requires an efficient technique for delivering large amounts of light power to the recording medium confined to spots of, for example, 50 nm or less. Recent designs of HAMR recording heads include a thin film waveguide on an AlTiC slider to guide light to a storage medium for localized heating of the storage medium. To launch light into the waveguide, a grating coupler can be used. Due to the limited size of the slider, the size of the incident beam is only ~50 µm. At this beam size and with conventional symmetric surface-corrugation grating couplers, coupling efficiency from the incident beam to the waveguide is low (<20%).

To increase coupling efficiency, a highly reflective layer/mask, called a mirror, can be used to reflect the beam transmitted through the grating and waveguide back into the grating region.

There is a need for a waveguide that can provide increased efficiency for coupling an electromagnetic wave into a waveguide.

SUMMARY OF THE INVENTION

This invention provides an optical waveguide comprising a core guiding layer; a cladding layer positioned adjacent to the core guiding layer; a reflective layer positioned adjacent to the cladding layer; and a grating for coupling light into the waveguide; wherein the cladding layer has a thickness such that a ray reflected from the reflective layer is phase matched to an incident ray at the grating.

In another aspect, the invention encompasses an optical waveguide comprising a core guiding layer; a cladding layer positioned adjacent to the core guiding layer; and a grating having a period $\Lambda$ of $$\frac{\lambda}{n_{\mathit{eff}}} < \Lambda < \frac{2\lambda}{n_{\mathit{eff}} + n_s},$$

for coupling light into the core guiding layer, wherein $n_{\mathit{eff}}$ is the effective refractive index of the waveguide, $n_s$ is the refractive index of the cladding layer, and $\lambda$ is the wavelength of an electromagnetic wave.

In another aspect, the invention provides a method of coupling electromagnetic radiation into optical waveguide including a core guiding layer, a cladding layer positioned adjacent to the core guiding layer, a reflective layer positioned adjacent to the cladding layer, and a grating for coupling light into the core guiding layer, the method comprising: directing first and second rays onto the grating, wherein the first and second rays are in phase with each other and wherein the cladding layer has a thickness such that the first ray reflected from the reflective layer is phase matched to the second ray at the grating.

The invention also encompasses a method of coupling electromagnetic radiation into optical waveguide including a core guiding layer, a cladding layer positioned adjacent to the core guiding layer, a reflective layer positioned adjacent to the cladding layer, and a grating for coupling light into the core guiding layer, the method comprising: directing electromagnetic radiation onto the grating to create a guided mode in the guiding layer, wherein radiated rays from the guided mode into the cladding layer are in-phase or have a phase difference of multiple $2\pi$.

Recording heads that include the waveguide, and disc drives that include the recording heads are also included.

DETAILED DESCRIPTION OF THE INVENTION

Figure 1:
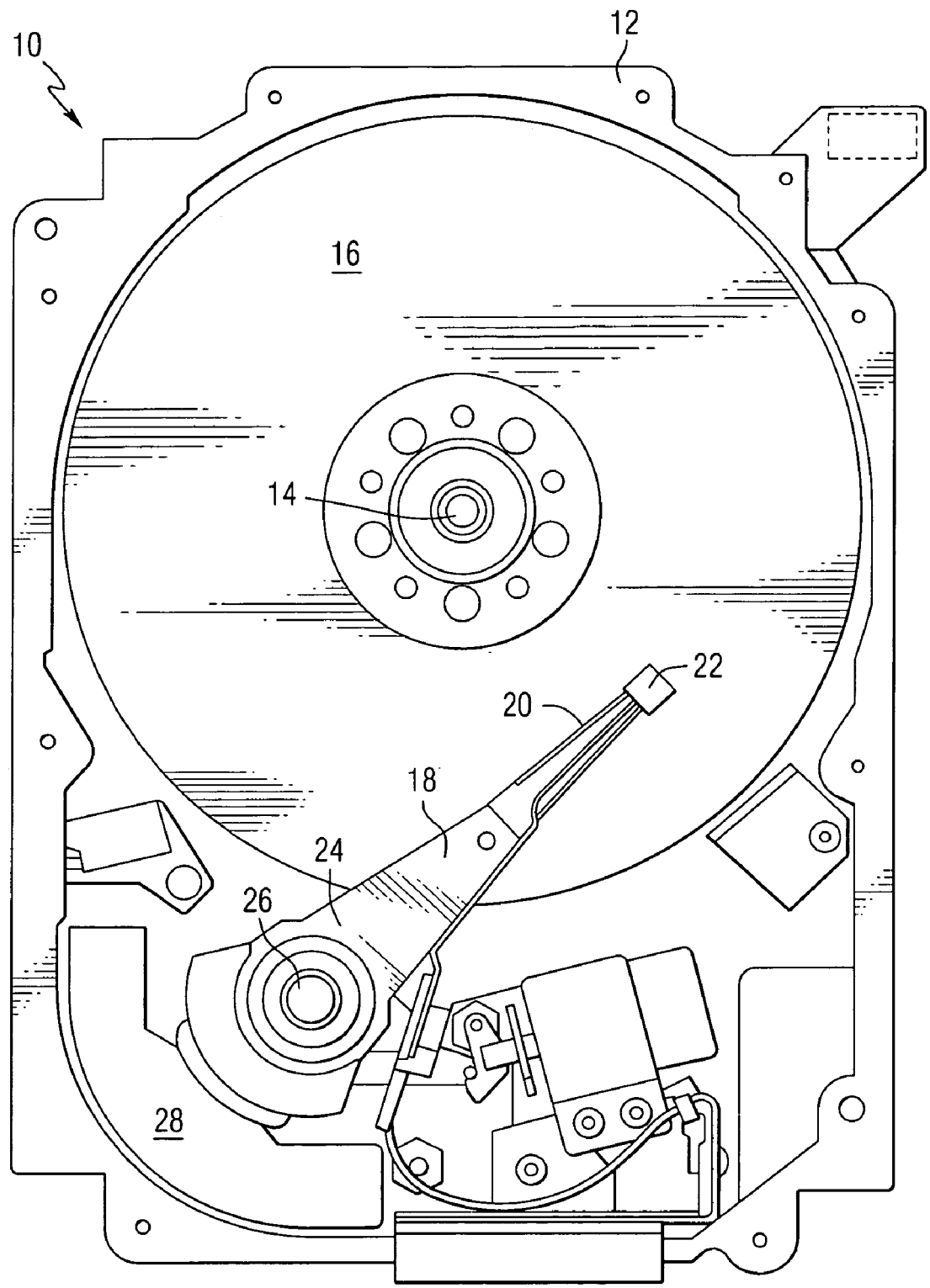
FIG. 1 is a pictorial representation of a magnetic disc drive that can include magnetic heads constructed in accordance with this invention.

This invention encompasses waveguides that can be used in magnetic and optical recording heads for use with magnetic and/or optical recording media, as well as magnetic and/or optical recording heads that include such devices and disc drives that include the recording heads. FIG. 1 is a pictorial representation of a disc drive 10 that can utilize recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

For heat assisted magnetic recording, an electromagnetic wave of, for example, visible, infrared or ultraviolet light is directed onto a surface of a data storage medium to raise the temperature of a localized area of the medium to facilitate switching of the magnetization of the area. This invention provides an efficient means of coupling an electromagnetic wave to a planar waveguide, which can be used to direct the electromagnetic wave to the surface of a recording medium.

Figure 2:
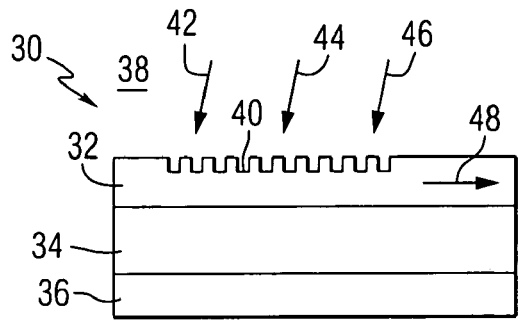
FIGS. 2, 3, 4 and 5 are schematic representations of waveguides constructed in accordance with this invention.

FIG. 2 is a schematic representation of a portion of a waveguide 30 constructed in accordance with this invention. The waveguide includes a guiding core layer 32, a cladding layer 34 adjacent to the core layer, and a highly reflective layer 36 adjacent to the cladding layer. A cover layer 38, which can be air, is positioned adjacent to the guiding core. A grating 40 is positioned at the interface between the cover layer and the guiding core. A coherent source of electromagnetic radiation, such as a laser, produces a polarized beam of light illustrated by optic rays 42, 44 and 46, that is incident on the grating. Arrow 48 represents light that is coupled into the waveguide. In FIG. 2, the grating coupler is at the interface between the cover layer and the guiding core layer, and is formed by periodic grooves in the guiding layer. This arrangement is referred to as surface-corrugation. The groove profiles can be rectangular and oriented perpendicular to the direction of propagation of the light in the guiding layer. Alternatively, the groove profiles can be sinusoidal or blazed.

Figure 3:
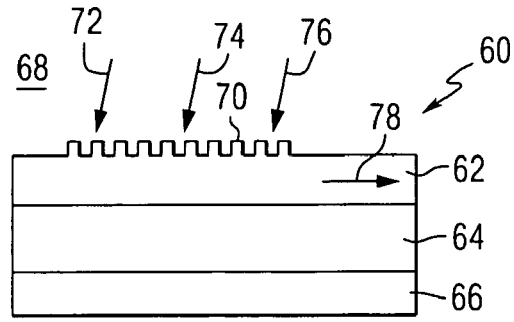

FIG. 3 is a schematic representation of a waveguide 60 constructed in accordance with this invention. The waveguide includes a guiding core layer 62, a cladding layer 64 adjacent to the core layer, and a highly reflective layer 66 adjacent to the cladding layer. A cover layer 68, which can be air, is positioned adjacent to the guiding core. A grating 70 is positioned at the interface between the cover layer and the guiding core. A coherent source of electromagnetic radiation, such as a laser, produces a polarized beam of light illustrated by optic rays 72, 74 and 76 that illuminates the grating. Arrow 78 represents light that is coupled into the waveguide by ridges on the guiding layer. The example of FIG. 3 is also referred to surface-corrugation. The ridges can be rectangular and oriented perpendicular to the direction of propagation of the light in the guiding layer. Alternatively, the ridges can be sinusoidal or blazed.

Figure 4:
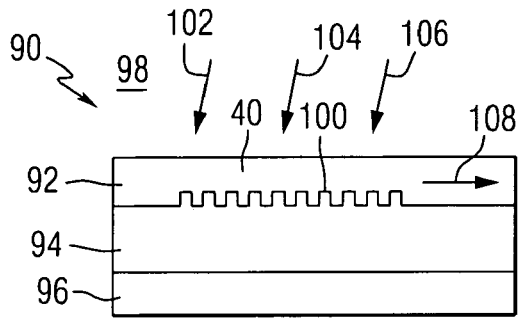

FIG. 4 is a schematic representation of a waveguide 90 constructed in accordance with this invention. The waveguide includes a guiding core layer 92, a cladding layer 94 adjacent to the core layer, and a highly reflective layer 96 adjacent to the cladding layer. A cover layer 98, which can be air, is positioned adjacent to the guiding core. A grating 100 is positioned at the interface between the cover layer and the guiding core. A coherent source of electromagnetic radiation, such as a laser, produces a polarized beam of light illustrated by optic rays 102, 104 and 106 that is delivered to the grating. Arrow 108 represents light that is excited in the waveguide. In FIG. 4, the grating coupler is at the interface between the guiding core layer and the cladding layer adjacent the mirror layer, and is formed by periodic grooves in the guiding layer. This arrangement is referred to as cladding-corrugation.

Figure 5:
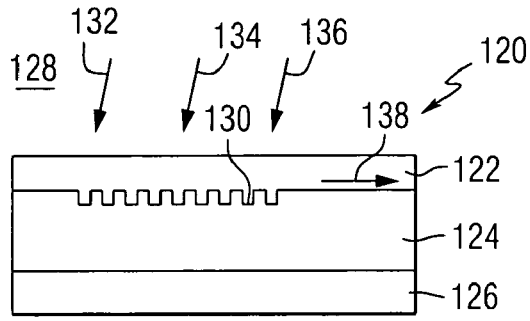

FIG. 5 is a schematic representation of a waveguide 120 constructed in accordance with this invention. The waveguide includes a guiding core layer 122, a cladding layer 124 adjacent to the core layer, and a highly reflective layer 126 adjacent to the cladding layer. A cover layer 128, which can be air, is positioned adjacent to the guiding core. A grating 130 is positioned at the interface between the cover layer and the guiding core. A source of electromagnetic radiation, such as a laser, produces a beam of light illustrated by arrows 132, 134 and 136 that is delivered to the grating. Arrow 138 represents light that is transmitted in the guiding core layer, and is launched by ridges on the cladding layer. The example of FIG. 5 uses cladding-corrugation.

FIGS. 2–5 show four possible configurations of grating couplers with a highly reflective layer. A beam of light is incident on a grating from a cover layer in FIGS. 2 and 3, or through a guiding layer in FIGS. 4 and 5. The cover layer can be free space, or another cladding layer. In FIGS. 2 and 3 the grating coupler is at the interface between the cover layer and the guiding (core) layer, referred to surface-corrugation hereafter. In FIGS. 4 and 5, the grating coupler is at the interface between the guiding layer and the cladding layer, called cladding-corrugation.

Figure 6:
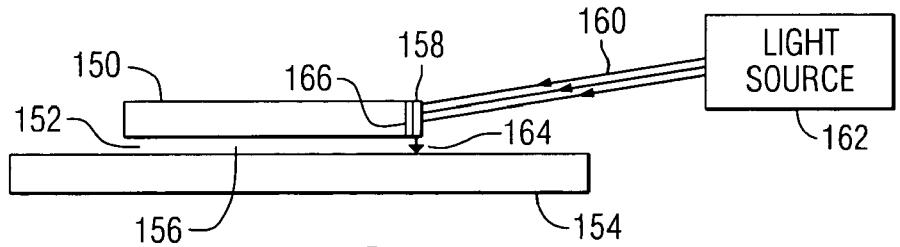
FIG. 6 is a side elevation view of a slider that can include the waveguides of this invention.

FIG. 6 is a side elevation view of a slider 150 that can include the waveguides of this invention. The slider includes an air bearing surface 152 that is positioned adjacent to a magnetic storage medium in the form of a disc 154. In operation, an air bearing 156 is formed between the spinning disc and the slider to prevent contact between the slider and the disc. A waveguide 158, which can be constructed in accordance with any of the disclosed examples of FIGS. 2, 3, 4 or 5, is mounted at one end of the slider. Light illustrated by rays 160 is supplied by a light source such as a laser, and is directed onto the waveguide, and a portion of the light is coupled into the waveguide by a grating coupler. A beam of light illuminates the slide where a thin-film waveguide is mounted. Light is coupled into the waveguide from free space, propagates, focused onto the magnetic disk for localized heating in assisting magnetic recording. The light is directed toward the storage medium as illustrated by arrows 164. If the slider is used in a magneto-optical recording application, a magnetic write pole 166 can be positioned adjacent to the waveguide to provide a magnetic write field.

For HAMR optical waveguides, the beam of light illuminates the slider from free space, as shown in FIG. 6. This means that the wave vector $\vec{k}$ of the incident beam has a component toward the magnetic disc below the slide. Otherwise, extra optical components would be needed to shine the incident light onto a grating coupler.

Figure 7:
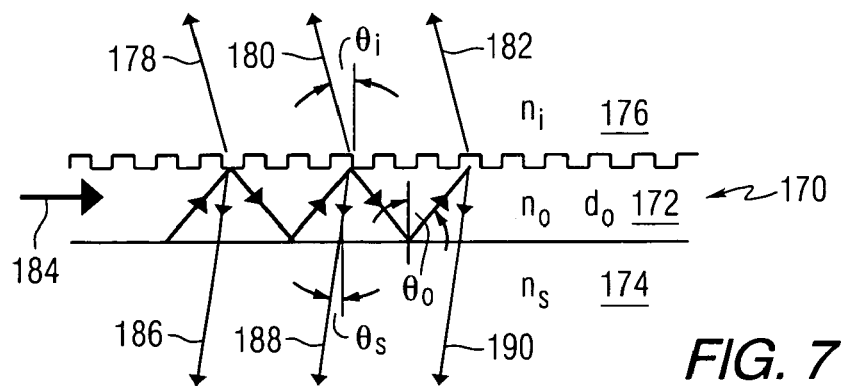
FIGS. 7, 8, 9 and 10 are schematic diagrams that illustrate the operation of the waveguides of this invention.
Figure 8:
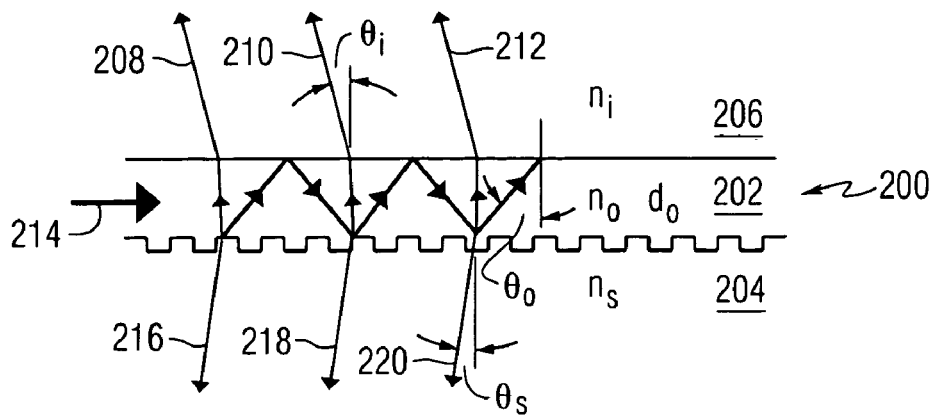

FIGS. 7 and 8 show emissions (radiation) of guided light in the waveguide propagating through the grating coupler. The waveguide 170 of FIG. 7 includes a core layer 172 and a cladding layer 174. A cover layer 176, which can be air, is positioned on the top of the guiding layer. Rays 178, 180 and 182 illustrate radiation of a propagation mode illustrated by arrow 184 into the cover layer. Rays 186, 188 and 190 illustrate radiation of a propagation mode into the cladding layer 174 for surface-corrugation. The waveguide 200 of FIG. 8 comprises a core layer 202, a cladding layer 204, and a cover layer 206. Rays 208, 210 and 212 illustrate radiation of a waveguide mode illustrated by arrow 214 into the cover layer. Rays 216, 218 and 220 illustrate radiation of a propagation mode into the cladding layer 204 for cladding-corrugation. In FIGS. 7 and 8, $n_i$ is the refractive index of the cover layer, $n_0$ is the refractive index of the core layer, $n_s$ is the refractive index of the cladding layer, and $d_0$ is the thickness of the guiding layer.

Figure 9:
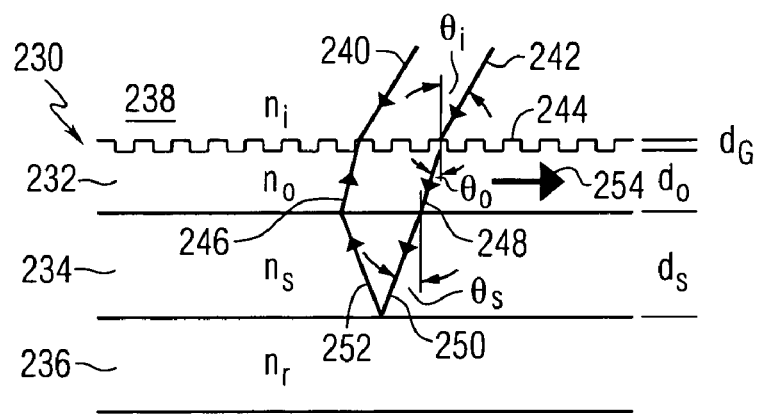
Figure 10:
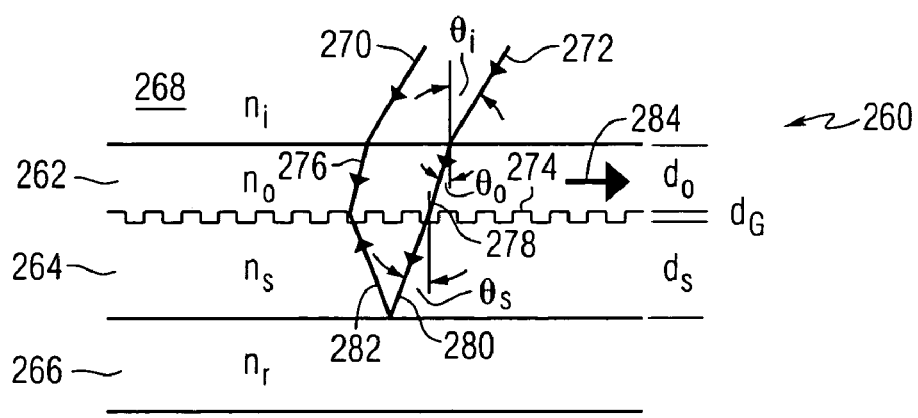

FIGS. 9 and 10 show the excitation of a waveguide mode, based on ray-optics. Waveguide 230 of FIG. 9 includes a guiding layer 232, a cladding layer 234, and a reflective layer 236, and a cover layer 238. Rays 240 and 242 represent the beam of light incident on the grating 244 from the cover layer. Grating 244 is positioned at the interface between the cover layer and the guiding layer. Ray 242 transmits through the guiding layer, illustrated by ray 248, and the cladding layer, illustrated by ray 250, and is reflected back at the interface between the cladding layer and the reflective layer. The reflected ray transmits through the cladding layer, as represented by ray 252, the guiding layer, as represented by ray 246, and meets with the incident ray 240 at the grating. Arrow 254 illustrates waveguide mode excited in the waveguide.

Waveguide 260 of FIG. 10 includes a core layer 262, a cladding layer 264, a reflective layer 266, and a cover layer 268. Rays 270 and 272 represent a beam of light incident on the grating 274 from the cover layer. Grating 274 is positioned at the interface between the cover layer and the guiding layer. Ray 272 transmits through the guiding layer, illustrated by ray 278, and the cladding layer, illustrated by ray 280, and is reflected back at the interface between the cladding layer and the reflective layer. The reflected ray transmits through the cladding layer, as represented by ray 282, and meets with the transmitted ray 276 from the incident ray 270 at the grating. Arrow 284 illustrates the excited waveguide mode propagating in the waveguide.

In FIGS. 7 and 8, the angle of radiated beam into the cover layer is $\theta_i$ and that of radiated beam into the cladding layer is $\theta_s$, which are governed by the expression:

$$n_i \sin\theta_i = n_s \sin\theta_s = n_{\mathit{eff}} + m \frac{\lambda}{\Lambda} \quad (1)$$

Here $n_i$ is the refractive index of the cover layer, $n_s$ is the refractive index of the cladding layer, $n_{\mathit{eff}}$ is the effective refractive index of the guiding mode in the grating region, $\lambda$ is the wavelength of light in free space, $\Lambda$ is the period of the grating, and m is an integer. For efficient coupling-in it is preferred that only one radiation beam, m=−1, escapes from the waveguide into the cover layer and the cladding layer, see FIGS. 7 and 8, and all other modes with m≠−1 are evanescent waves. Since $n_s \geq n_i$, this requires that:

$$\left| n_{\mathit{eff}} - \frac{\lambda}{\Lambda} \right| < n_i \quad (2a)$$

$$\left| n_{\mathit{eff}} - 2\frac{\lambda}{\Lambda} \right| < n_s \quad (2b)$$

For the forward coupling-in shown in FIG. 6, the above conditions (2a) and (2b) are simplified to:

$$\frac{\lambda}{n_{\mathit{eff}}} < \Lambda < \frac{2\lambda}{n_{\mathit{eff}} + n_s} \quad (3)$$

In Equation (3), the minimum value of $\Lambda$ is to ensure forward coupling-in, while the maximum value of $\Lambda$ is for only one radiation beam into the cladding layer. For instance, at $\lambda$=0.633 µm, $n_i$=1, $n_0$=2.09, $d_0$=0.1 µm, $n_s$=1.47, $TE_0$ is the only guided mode, for a rectangular groove of 50% duty cycle on the top of the guiding layer at groove depth=17 nm, and $n_{\mathit{eff}}$=1.612. Based on Equation (3), the range for groove period is: 0.393 µm<$\Lambda$<0.41 µm.

Moreover, for highly efficient coupling-in with the mirror configurations shown in FIGS. 7 and 8, it is required that two consecutive rays, for instance, rays 186 and 188 shown in FIG. 7, or rays 216 and 218 shown in FIG. 8, be in-phase. The ray propagating in the waveguide hits the grating and radiates rays 186, 188, and 190 in FIG. 7, or rays 216, 218, and 220 in FIG. 8. This means that:

$$\text{phase difference} = k_0 \frac{2d_{\mathit{eff}}}{\cos\theta_0}(n_0 - \sin\theta_0 \cdot n_s \sin\theta_s) = l \cdot 2\pi \quad (4a)$$

for surface-corrugation coupling-in, and:

$$\text{phase difference} = k_0 \frac{2d_{\mathit{eff}}}{\cos\theta_0}(n_0 - \sin\theta_0 \cdot n_s \sin\theta_s) + \phi = l \cdot 2\pi \quad (4b)$$

for cladding-corrugation coupling-in, where l is an integer. The phase difference is the time difference, multiplied by the angular frequency of the electromagnetic wave, between two rays. Here $$k_0 = \frac{2\pi}{\lambda}$$

is the free-space wave number, $d_{\mathit{eff}}$ is the effective guiding layer thickness in the grating region, $$\theta_0 \left( = \arcsin\!\left(\frac{n_{\mathit{eff}}}{n_0}\right) \right)$$

is the angle of incidence of guided-mode rays, and $\phi$ is Goos-Hanchen phase-shift of the guided mode ray striking at the cover/core interface. For TE modes:

$$\phi = -2\tan^{-1}\frac{\sqrt{(n_0 \sin\theta_0)^2 - n_c^2}}{n_0 \cos\theta_0}. \quad (5)$$

For coupling-in shown in FIGS. 9 and 10, one portion of the incident beam is coupled into the waveguide and another portion of the incident beam transmits through the guiding layer to the cladding layer. Those waves that are coupled into the waveguide also partially radiate into the cover layer and the cladding layer. If the conditions of Equations (4a) and (4b) are satisfied, both the transmitted beam and the leaky (radiated) beam from the guiding layer into the cladding layer are in-phase. When a mirror is placed underneath the cladding layer, both the transmitted beam and the leaky beam will be reflected back to the grating region and superimposed on the incident beam in-phase by tuning the cladding layer thickness. In practice, for a given waveguide structure, the conditions of Equations (4a) and (4b) may be satisfied by tuning the grating period, which varies the angle of incidence for the coupling-in.

FIGS. 9 and 10 show the principle of determining the cladding layer thickness for surface-corrugation (FIG. 9) and for cladding-corrugation (FIG. 10). The cladding layer thickness is chosen such that: (1) the reflected beam from the mirror is phase-matched to the incident beam at the grating region, see rays 246 and 240 in FIG. 9 or rays 282 and 276 in FIG. 10; and (2) only a small amount of guided light gets absorbed in the mirror layer. To find the correct cladding layer thickness $d_s$, for efficient coupling-in, first find the condition where little light is coupled in. When ray 246 in FIG. 9 or ray 282 in FIG. 10 (the reflected beam from the mirror) has a multiple of $\pi$ phase-shift from ray 240 in FIG. 9 or ray 276 in FIG. 10, little light will be coupled into the waveguide. The minimum cladding layer thickness, $d_{sm}$, for a $\pi$ phase-shift is:

$$2k_0 \left[ 0.5 d_G \frac{n_G - \sin\theta_G \cdot n_i \sin\theta_i}{\cos\theta_G} + d_0 \frac{n_0 - \sin\theta_0 \cdot n_i \sin\theta_i}{\cos\theta_0} + d_{sm} \frac{n_s - \sin\theta_s \cdot n_i \sin\theta_i}{\cos\theta_s} \right] + \phi_1 = \pi \quad (6a)$$

for surface-corrugation, and:

$$2k_0 \left[ 0.5 d_G \frac{n_G - \sin\theta_G \cdot n_i \sin\theta_i}{\cos\theta_G} + d_{sm} \frac{n_s - \sin\theta_s \cdot n_i \sin\theta_i}{\cos\theta_s} \right] + \phi_1 = \pi \quad (6b)$$

for cladding-corrugation. Here $n_G$ is the effective index of the groove region, and $d_G$ is the depth of the groove. For a rectangular groove of 50% duty cycle and a sinusoidal groove, $$n_G = \sqrt{\frac{n_i^2 + n_0^2}{2}}$$

for surface-corrugation, and $$n_G = \sqrt{\frac{n_s^2 + n_0^2}{2}}$$

for cladding-corrugation. Indices $n_i$, $n_0$, and $n_s$ are the refractive index for the cover layer, the guiding layer, and the cladding layer, respectively. Angles $\theta_i$, $\theta_G$, $\theta_0$, and $\theta_s$ are the angle of incidence in the cover layer, grating region, guiding layer, and cladding layer, as shown in FIGS. 9 and 10. Snell's law gives:

$$n_i \sin\theta_i = n_G \sin\theta_G = n_0 \sin\theta_0 = n_s \sin\theta_s. \quad (7)$$

In equations (6a) and (6b), $\phi_1$ is the phase shift when ray 250 in FIG. 9 or ray 280 in FIG. 10 is reflected from the mirror layer.

For efficient coupling-in the cladding layer thickness, $d_s$, can be chosen from the range:

$$d_{sm} + l\frac{\lambda}{2n_s}\cos\theta_s < d_s < d_{sm} + (l+1)\frac{\lambda}{2n_s}\cos\theta_s \quad l = 0, 1, 2, 3, \quad (8)$$

Preferably:

$$d_s = d_{sm} + (l+0.5)\frac{\lambda}{2n_s}\cos\theta_s \quad l = 0, 1, 2, 3, \quad (9)$$

A guided wave traveling in a corrugated part of a waveguide may radiate into the media adjoining the waveguide, as shown in FIGS. 7 and 8. The amplitude of vector electric field in the guiding layer decays exponentially along the corrugated region: $e^{-\alpha z}$. Here $\alpha$ is the attenuation coefficient, and z is the distance away from the beginning of the corrugation. The attenuation coefficient $\alpha$ is related to the waveguide structure, groove geometry, and corrugation. There have been extensive studies on $\alpha$. In practice, the $\alpha$ value can be tuned for optimal coupling by varying the groove depth and/or the groove duty cycle for a given waveguide structure. The optimal condition for efficiently coupling a Gaussian beam into a waveguide has been previously determined as:

$$\alpha w \approx 0.68 \quad (10)$$

Here w is the $1/e^2$ radius in the intensity I(z) of a Gaussian beam incident on the grating coupler:

$$I(z) = I_0 \exp\left[-2\frac{(z-z_0)^2}{w^2}\right] \quad (11)$$

For those simulated results shown in FIGS. 11–21, it is assumed that the core layer is $Ta_2O_5$ and the cladding layer $SiO_2$. The grating coupler has a rectangular groove profile with 50% duty cycle. A linearly polarized Gaussian beam of light is incident on the waveguide film from air. The beam has a full width of 50 μm at its $1/e^2$ intensity point at its waist. The center of the beam waist is on the surface of the waveguide. At the light wavelength $\lambda$=0.633 μm, the refractive index of the $Ta_2O_5$ guiding layer is $n_0$=2.09, and that of the SiO cladding layer $n_s$=1.47. The $Ta_2O_5$ guiding layer is 0.1 μm thick. The only guided mode in this waveguide is $TE_0$.

Figure 11:
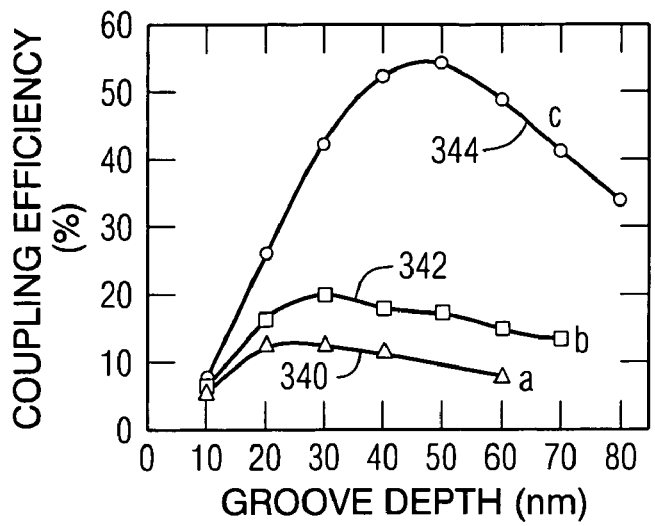
FIGS. 11, 12, 13, 14, 15, 16, 17, 18, 19, 20 and 21 are graphs of calculated data illustrating various features of the waveguides of this invention.

FIG. 11 shows the calculated coupling efficiency η as a function of groove depth $d_G$ for three cases without a mirror layer. Curve 340 corresponds to surface-corrugation with groove period Λ=0.68 μm. Curve 342 also corresponds to surface-corrugation, but with Λ=0.36 μm. Curve 344 corresponds to cladding-corrugation with Λ=0.36 μm. It is seen that η<20% in surface-corrugation. In cladding-corrugation η reaches 55% at the optimal depth $d_G$=50 nm.

Figure 12:
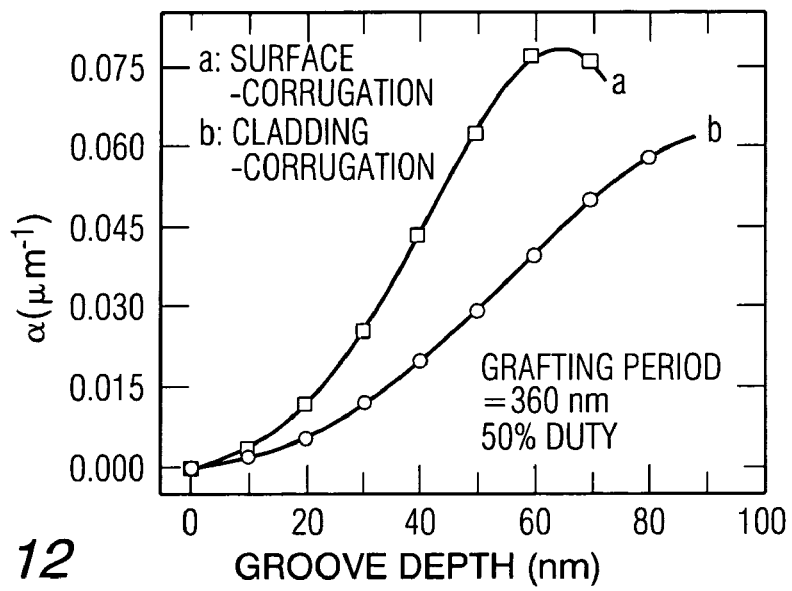

FIG. 12 shows the calculated attenuation coefficient $\alpha$ of guided wave in the grating region versus groove depth for both surface-corrugation and cladding-corrugation without a mirror layer, for a grating period of Λ=0.36 μm. When the guided light propagates through the corrugation, it decays exponentially with a coefficient $\alpha$. As expected, $\alpha$ increases with groove depth. The optimal groove depth for coupling the 50 μm Gaussian beam into the waveguide, according to Equation (10), is 0.68/25=0.027 µm$^{-1}$, which corresponds to $d_G$=30 nm for the surface-corrugation, and $d_G$=50 nm for the cladding-corrugation. This is consistent with the calculated coupling efficiency shown in FIG. 11.

Figure 13:
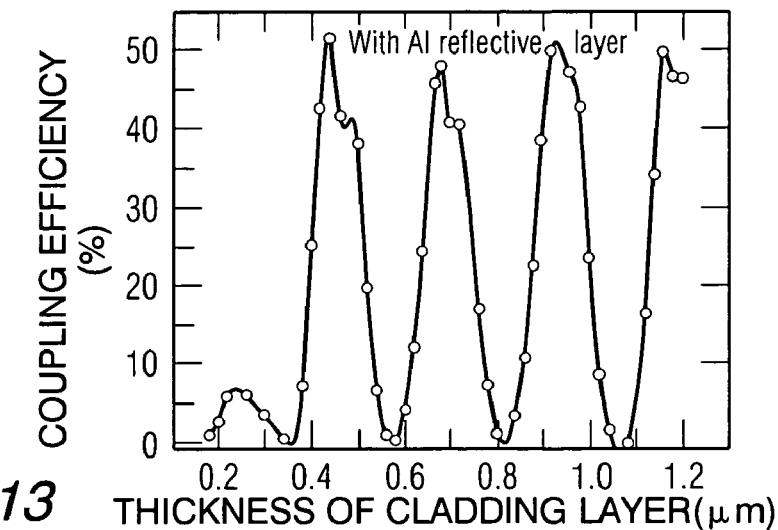
Figure 14:
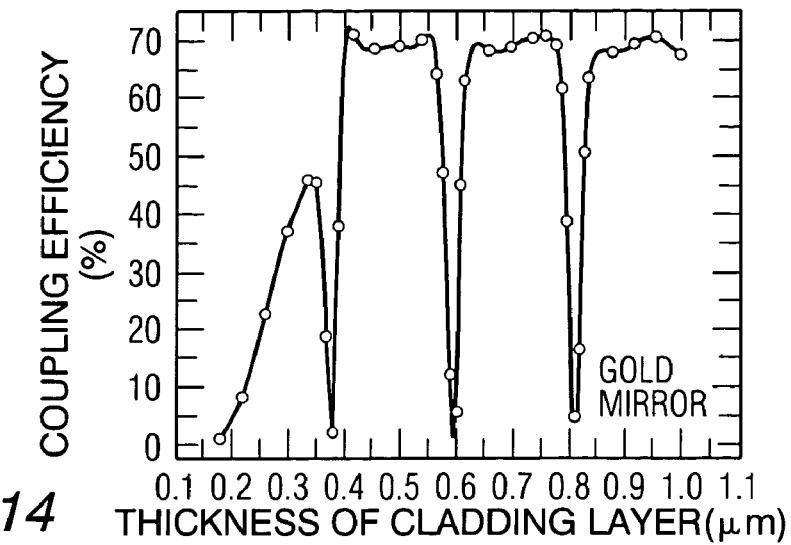

With a mirror placed underneath the cladding layer, most of the transmitted beam (into the cladding layer) and the leaky wave escaped from the guiding layer will be reflected back into the grating region, the coupling efficiency will be greatly increased if those waves are properly phase-matched to the incident beam in the grating region and the groove depth is optimized for a given sized incident beam. FIG. 13 shows the calculated coupling-in efficiency versus groove depth for a surface-corrugation with $\Lambda$=0.68 µm, $d_G$=20 nm, and $\theta_i$=42.50. FIG. 14 shows the calculated coupling-in efficiency versus groove depth for a cladding-corrugation with $\Lambda$=0.36 µm, $d_G$=50 nm, and $\theta_i$=-12°. In FIG. 13, an aluminum layer is used for reflection. In FIG. 14, a gold layer is used for reflection. In the calculation the complex refractive index of the aluminum layer was assumed to be $n_r$=1.39+j 7.65 and that of the gold layer was assumed to be $n_r$=0.183+j 3.09. For the cladding layer thickness $d_s$>0.4 µm, the coupling efficiency $\eta$ varies periodically with the cladding layer thickness, and the peak coupling efficiency is much greater than that without a mirror layer.

For the cladding-corrugation coupling efficiency shown in FIG. 14, $$n_G = \sqrt{\frac{1.47^2 + 2.09^2}{2}} = 1.8068,$$

$n_G \sin \theta_G = n_s \sin \theta_s = \sin(-12°) = -0.2079$, $\phi_1 = -0.721\pi$. From Equation (6b), we get $d_{sm}$=0.165 µm. From Equation (8), we get: $0.165+0.213l < d_s < 0.165+0.213(l+1)$. At the cladding layer thickness $d_s$=0.165 µm, 0.378 µm, 0.59 µm, and 0.804 µm, little light is coupled into the waveguide, which is consistent with the full-vector calculation shown in FIG. 14.

Figure 15:
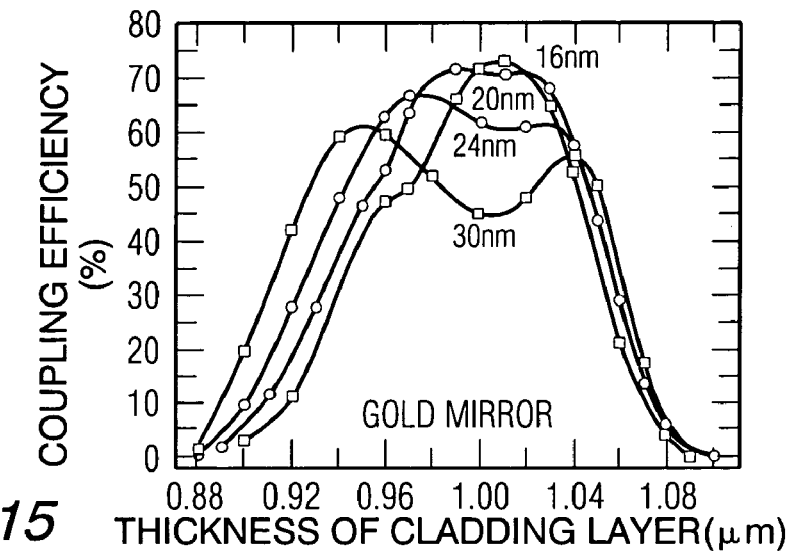
Figure 16:
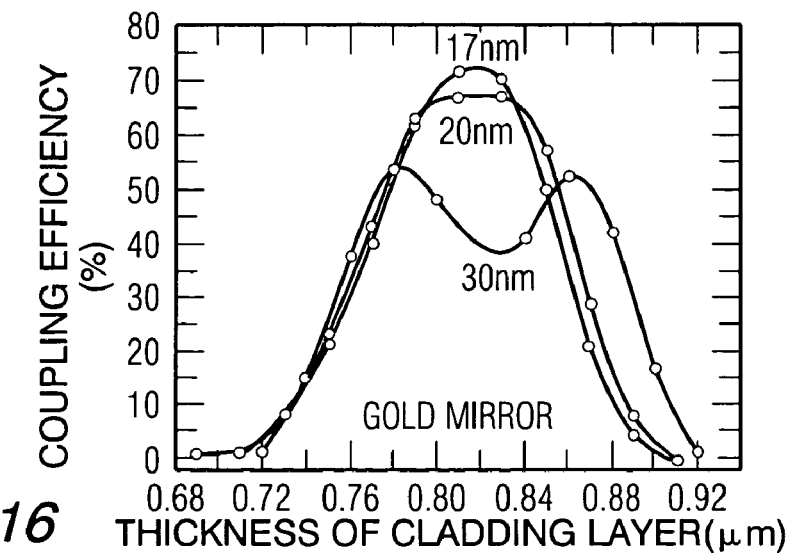
Figure 17:
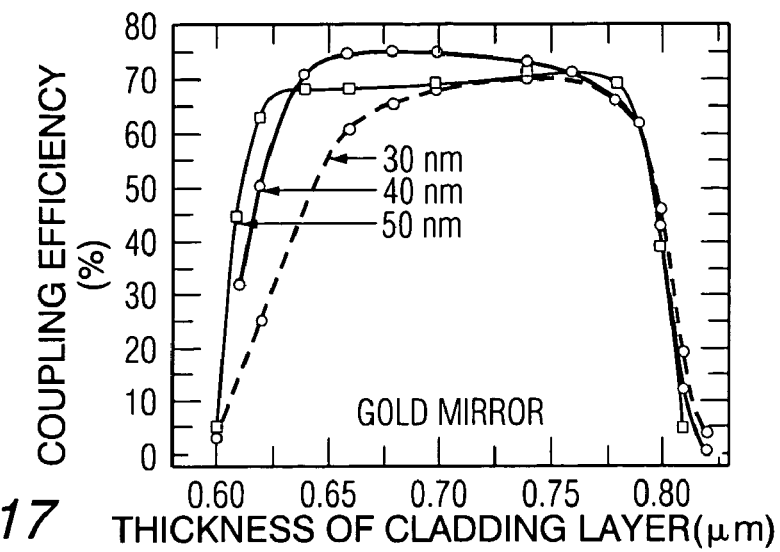

FIGS. 15, 16 and 17 show the calculated coupling efficiency versus the cladding thickness at various groove depths. FIG. 15 shows the calculated coupling efficiency versus the cladding thickness for a surface-corrugation with the coupling grating on the top of the film's surface (see FIG. 3), with a grating period $\Lambda$=0.4 µm. FIG. 16 shows the calculated coupling efficiency versus the cladding thickness for a surface-corrugation with coupling grating deep into the core layer from the film's surface (see FIG. 2), with a grating period $\Lambda$=0.36 µm. FIG. 17 shows the calculated coupling efficiency versus the cladding thickness for a cladding-corrugation with the coupling grating deep into the core layer from the core/cladding interface (see FIG. 4), with a grating period $\Lambda$=0.36 µm. Since $\eta$ changes periodically with $d_s$, the computation is done only over one period. For instance, in FIG. 15, $$n_G = \sqrt{\frac{1.2^2 + 2.09^2}{2}} = 1.638,$$

$\phi_1$=-0.7186×$\pi$, $d_0$=0.1 µm, at $d_G$=20 nm, $\theta_i$=5.14°, $n_G \sin \theta_G = n_0 \sin \theta_0 = n_s$, $\sin \theta_s = \sin(5.14°) = 0.0896$. From Equation (6a), $d_{sm}$ is found to be 0.037 µm. From Equation (8), we get $d_{sm}$+0.2149l<$d_s$<$d_{sm}$+0.2149 (l+1). Taking l=4, $d_s$ ranges from 0.896 µm to 1.111 µm for one period.

From FIGS. 15, 16 and 17 it is seen that, at an optimal cladding layer thickness and at an optimal groove depth, more than 70% coupling efficiency can be theoretically obtained at all cases studied. For the surface-corrugation configuration of FIGS. 15 and 16, $\eta$ is enhanced by a factor of 3.5 with the implementation of a gold mirror layer in the waveguide. The optimal groove depth for maximized coupling-in efficiency is a result of balancing the coupling-in with coupling-out for a given size incident beam, which is assumed to be 50 µm in the simulation. With a gold mirror the optimal groove is shallower than that without a mirror, particularly for the surface-corrugation coupler configuration.

Figure 18:
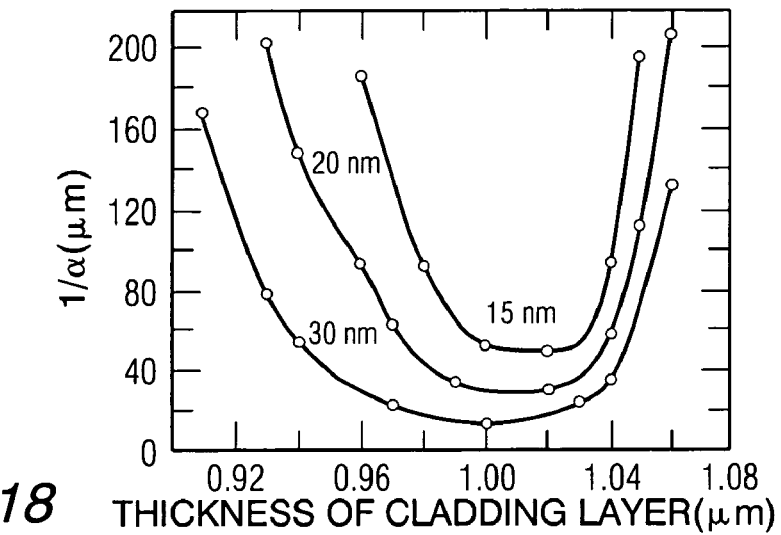
Figure 19:
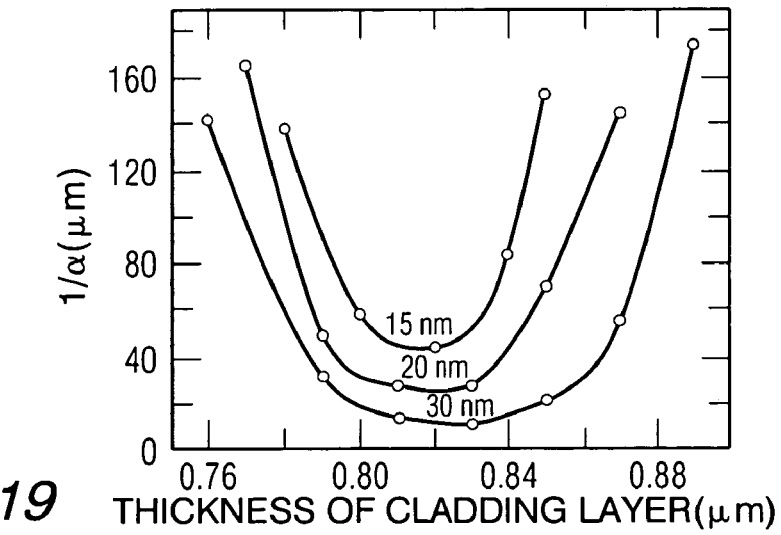
Figure 20:
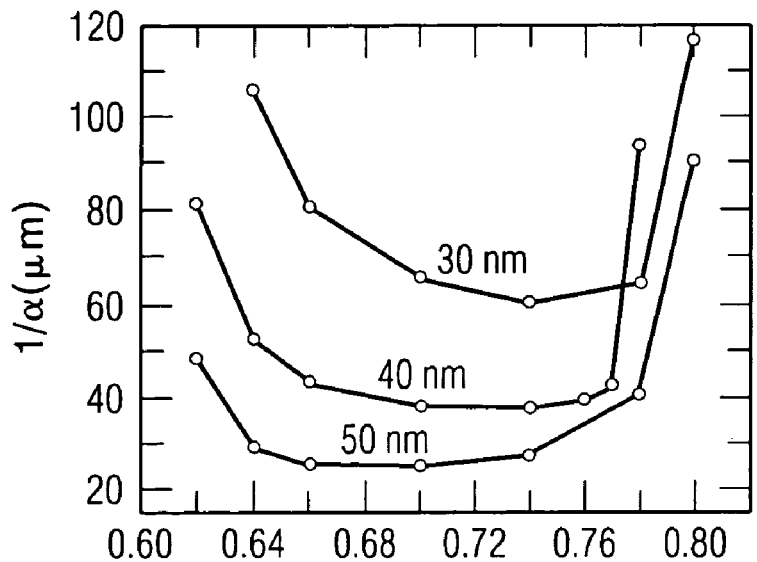

FIGS. 18, 19 and 20 show the reciprocal of attenuation coefficient (1/$\alpha$) versus cladding thickness $d_s$ at various groove depths for the three cases shown in FIGS. 15, 16 and 17. Physically, $\alpha$ also changes periodically with $d_s$, so the computation is carried out only over one period. At the cladding layer thickness $$d_{sz} = d_{sm} + l\frac{\lambda}{2n_s}\cos\theta_s,$$

due to the destructive interference of the radiated beam escaping from the guiding layer with the beam reflected from the highly reflective layer, $\alpha$ is nearly zero. For the surface-corrugation configuration, $\alpha$ is strongly dependent on the $d_s$. For the cladding-corrugation configuration, however, this dependence is smooth, except for near those $d_{sz}$. For an optimal coupling it is preferred to choose $d_s$ based on Equation (9) and the groove depth based on Equation (10). For a 50 µm incident beam, the groove depth is chosen such that $$\frac{1}{\alpha} \approx \frac{25}{0.68} = 38 \ \mu m.$$

This invention also encompasses a method for using a highly reflective layer/mask, called a mirror layer/mask, for efficient coupling-in. Simple mathematical formulas have been described for: (1) determining the angle of incidence; and (2) determining the thickness of the cladding layer between the guiding/core layer and the mirror layer, for the highest coupling-in efficiency.

To minimize the light absorbed from the guide mode by the mirror layer, the mirror layer should be placed outside of the evanescent tail of the guide mode. Light guided in a waveguide has some light (field) that penetrates into the cladding layer and the cover layer. The field strength decays exponentially from the interface between the guide layer and the cladding (cover) layer. These fields are referred to as evanescent waves. "Tail" means that the field is close to zero. This means that:

$$d_s >> \frac{1}{k_0\sqrt{n_{eff}^2 - n_s^2}} \qquad (12)$$

One example is given here to demonstrate the performance of above implementation. A Gaussian beam of light is incident on a 100-nm thick Ta$_2$O$_5$ waveguide film from air. The cladding layer is SiO. A gold film is used as the mirror layer. The incident beam has a 50 µm full width at the 1/e² intensity point. The coupling-in grating has a rectangular groove profile and is fabricated on the top of the guiding layer, as shown in FIG. 2. The groove depth $d_G$=20 nm, and the duty cycle=50%. At core layer of 100 nm, only one mode, $TE_0$, can be guided. At the grating region the guided mode has an effective index $n_{eff}$=1.672. To see the effect of the angle of incidence for coupling-in, two gratings differing in groove period are compared in the following.

First consider a grating with a groove period $\Lambda$=0.4 µm. At this period the angle of incidence for coupling-in is $\theta_i$=5.14°. $n_s \sin \theta_s$=sin(5.14°)=0.0896. The effective thickness is $d_0$=0.11 µm. So the left side of equation (4a) is:

$$k_0 \frac{2d}{\cos\theta_0}(n_0 - \sin\theta_0 \cdot n_s \sin\theta_s) =$$
$$\frac{2\pi}{0.633} \frac{2 \times 0.11}{0.6}(2.09 - 0.8 \times 0.0896) =$$
$$1.17 \times 2\pi$$

This means the radiated rays (see rays 186, 188, and 190 in FIG. 7) are nearly in-phase.

Next consider a grating with a groove period $\Lambda$=0.28 µm. At this period the angle of incidence for coupling-in is $\theta_i$=−36.05°. $n_s \sin \theta_s$=sin(−36.05°)=−0.5885. So the left side of equation (4a) becomes:

$$k_0 \frac{2d}{\cos\theta_0}(n_0 - \sin\theta_0 \cdot n_s \sin\theta_s) =$$
$$\frac{2\pi}{0.633} \frac{2 \times 0.11}{0.6}(2.09 - 0.8 \times 0.5885) =$$
$$1.48 \times 2\pi.$$

This means that the radiated rays are almost out of phase.

Figure 21:
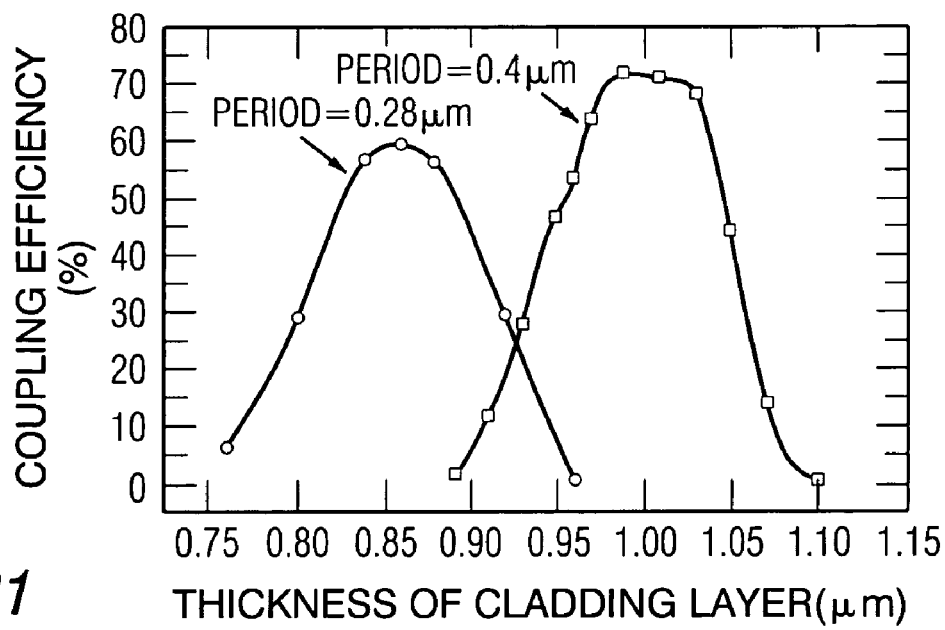

FIG. 21 shows the calculated coupling-in efficiency as a function of cladding layer thickness for groove period $\Lambda$=0.4 µm and 0.28 µm. Evidently, a grating with period of 0.4 µm has a 12% higher coupling-in efficiency than that of a grating with a period of 0.28 µm. Actually, an even higher efficiency can be obtained if Equation (4a) is fully satisfied. The theoretical upper limit for in-phase coupling-in efficiency is 81%.

The waveguides of this invention can be used in magneto-optic recording heads, and/or in optical recording applications in which a magnetic field is not needed, such as write once and phase change recording, or where an external magnet could be positioned below the substrate, such as in magneto-optic recording. Alternatively, these structures could potentially be useful in a probe storage application or any other application in which light is coupled into a waveguide.

In one aspect, this invention provides optical waveguides that include a highly reflective layer/mask, called mirror layer/mask, into the waveguide for efficient coupling-in. When used in a recording head, the mirror layer/mask is first coated on the slide where the waveguide film will be coated. By choosing suitable parameters, such as the angle of incidence, corrugation, groove depth, and thickness of cladding layer between the mirror layer and the guiding layer, highly efficient coupling-in can be obtained.

This invention encompasses a method of coupling electromagnetic radiation into optical waveguide including a core guiding layer, a cladding layer positioned adjacent to the core guiding layer, a reflective layer positioned adjacent to the cladding layer, and a grating for coupling light into the core guiding layer, the method comprising: directing electromagnetic radiation onto the grating to create a guided mode in the guiding layer, wherein the radiated rays from the guided mode into the cladding layer are preferably in-phase or have a phase difference of multiple $2\pi$.

This invention also encompasses a method of coupling electromagnetic radiation into optical waveguide including a core guiding layer, a cladding layer positioned adjacent to the core guiding layer, a reflective layer positioned adjacent to the cladding layer, and a grating for coupling light into the core guiding layer, the method comprising: directing first and second rays onto the grating, wherein the first and second rays are in phase with each other and wherein the cladding layer has a thickness such that the first ray reflected from the reflective layer is phase matched to the second ray at the grating.

While the invention has been described in terms of several examples, it will be apparent to those skilled in the art that various changes can be made to the disclosed examples, without departing from the scope of the invention as set forth in the following claims.

What is claimed is:

1. An optical waveguide comprising:
a core guiding layer;
a cladding layer positioned adjacent to the core guiding layer;
a reflective layer positioned adjacent to the cladding layer; and
a grating for coupling light into the waveguide;
wherein the cladding layer has a thickness such that a ray reflected from the reflective layer is phase matched to an incident ray at the grating.

2. The optical waveguide of claim 1, wherein consecutive leaky rays from the guiding layer at the grating are in-phase or have a phase difference of multiple $2\pi$.

3. The optical waveguide of claim 1, wherein the grating is positioned on a surface of the core guiding layer opposite the cladding layer.

4. The optical waveguide of claim 1, wherein the grating is positioned at an interface of the core guiding layer and the cladding layer.

5. The optical waveguide of claim 1, wherein the grating comprises a plurality of rectangular grooves in the core guiding layer.

6. The optical waveguide of claim 1, wherein the grating comprises a plurality of rectangular ridges on the core guiding layer.

7. A magneto-optical recording head comprising:
a magnetic write pole; and
the optical waveguide of claim 1 positioned adjacent to the magnetic write pole.

8. A disc drive comprising:
means for supporting a storage medium;
the magneto-optical recording head of claim 7; and
means for positioning the magneto-optical recording head adjacent to the storage medium.

9. An optical waveguide comprising:
a core guiding layer;
a cladding layer positioned adjacent to the core guiding layer; and
a grating having a period $\Lambda$ of $$\frac{\lambda}{n_{\mathit{eff}}} < \Lambda < \frac{2\lambda}{n_{\mathit{eff}} + n_s},$$

for coupling light into the waveguide, wherein $n_{\mathit{eff}}$ is the effective refractive index of the guiding layer, $n_s$ is the refractive index of the cladding layer, and $\lambda$ is the wavelength of an electromagnetic wave.

10. The optical waveguide of claim 9, wherein the grating is positioned on a surface of the core guiding layer opposite the cladding layer.

11. The optical waveguide of claim 9, wherein the grating is positioned at an interface of the core guiding layer and the cladding layer.

12. The optical waveguide of claim 9, wherein the grating comprises a plurality of rectangular grooves in the core guiding layer.

13. The optical waveguide of claim 9, wherein the grating comprises a plurality of rectangular ridges on the core guiding layer.

14. A magneto-optical recording head comprising:
a magnetic write pole; and
the optical waveguide of claim 9 positioned adjacent to the magnetic write pole.

15. A disc drive comprising:
means for supporting a storage medium;
the magneto-optical recording head of claim 14; and
means for positioning the magneto-optical recording head adjacent to the storage medium.

16. The disc drive of claim 15, wherein the means for supporting a storage medium comprised a spindle motor; and
the means for positioning the magneto-optical recording head adjacent to the storage medium comprises an arm.

17. A method of coupling electromagnetic radiation into optical waveguide including a core guiding layer, a cladding layer positioned adjacent to the core guiding layer, a reflective layer positioned adjacent to the cladding layer, and a grating for coupling light into the core guiding layer, the method comprising:
directing first and second rays onto the grating, wherein the first and second rays are in phase with each other and wherein the cladding layer has a thickness such that the first ray reflected from the reflective layer is phase matched to the second ray at the grating.

18. A method of coupling electromagnetic radiation into optical waveguide including a core guiding layer, a cladding layer positioned adjacent to the core guiding layer, a reflective layer positioned adjacent to the cladding layer, and a grating for coupling light into the core guiding layer, the method comprising: directing electromagnetic radiation onto the grating to create a guided mode in the guiding layer, wherein radiated rays from the guided mode into the cladding layer are in-phase or have a phase difference of multiple $2\pi$.

* * * * *

UNITED STATES PATENT AND TRADEMARK OFFICE
CERTIFICATE OF CORRECTION

PATENT NO. : 7,151,738 B2
APPLICATION NO. : 10/718162
DATED : December 19, 2006
INVENTOR(S) : Chubing Peng It is certified that error appears in the above-identified patent and that said Letters Patent is hereby corrected as shown below:

Detailed Description of the Invention
Column 5, Line 61 (Equation (2b)
"<$n_s$" should be -->$n_s$--

Column 7, Line 19
"...thickness $d_s$,..." should be --...thickness $d_s$..." (delete comma)

Column 9, Line 14
"...and $\theta_i$=42.50." should read --...and $\theta_i$=42.5°.--

Column 9, Line 64
"$\theta_G$=$n_o$ sin $\theta_o$=$n_s$, sin..." should read --$\theta_G$=$n_o$ sin $\theta_o$=$n_s$ sin...-- (delete comma)

Column 11, Line 34
"(2.09 − 0.8 x 0.5885) =" should read --(2.09 + 0.8 x 0.5885) =--

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,151,738 B2
APPLICATION NO. : 10/718162
DATED : December 19, 2006
INVENTOR(S) : Chubing Peng It is certified that error appears in the above-identified patent and that said Letters Patent is hereby corrected as shown below:

Detailed Description of the Invention

Column 8, Line 8 (Equation (8))

$$d_{sm} + l\frac{\lambda}{2n_s}\cos\theta_s < d_s < d_{sm} + (l+1)\frac{\lambda}{2n_s}\cos\theta_s \quad l = 0,1,2,3, \qquad (8)$$

should read $$d_{sm} + l\frac{\lambda}{2n_s}\cos\theta_s < d_s < d_{sm} + (l+1)\frac{\lambda}{2n_s}\cos\theta_s \quad l = 0,1,2,3,\cdots \qquad (8)$$

Column 8, Line 12 (Equation (9))

$$d_s = d_{sm} + (l+0.5)\frac{\lambda}{2n_s}\cos\theta_s \quad l = 0,1,2,3, \qquad (9)$$

should read $$d_s = d_{sm} + (l+0.5)\frac{\lambda}{2n_s}\cos\theta_s \quad l = 0,1,2,3,\cdots \qquad (9)$$

Signed and Sealed this

Eleventh Day of December, 2007

JON W. DUDAS
*Director of the United States Patent and Trademark Office*